United States Patent
Xia et al.

(10) Patent No.: US 8,675,627 B2
(45) Date of Patent: Mar. 18, 2014

(54) ADAPTIVE PRECODING CODEBOOKS FOR WIRELESS COMMUNICATIONS

(75) Inventors: Pengfei Xia, San Diego, CA (US); Yang Tang, San Diego, CA (US); Zhigang Rong, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 692 days.

(21) Appl. No.: 12/621,288

(22) Filed: Nov. 18, 2009

(65) Prior Publication Data

US 2010/0238913 A1    Sep. 23, 2010

Related U.S. Application Data

(60) Provisional application No. 61/162,591, filed on Mar. 23, 2009, provisional application No. 61/166,133, filed on Apr. 2, 2009.

(51) Int. Cl.
*H04B 7/216*    (2006.01)

(52) U.S. Cl.
USPC ........... 370/342; 370/310; 370/320; 370/335; 370/441

(58) Field of Classification Search
None
See application file for complete search history.

(56) References Cited

U.S. PATENT DOCUMENTS

| | | | |
|---|---|---|---|
| 6,785,341 B2 | 8/2004 | Walton et al. | |
| 6,859,503 B2 | 2/2005 | Pautler et al. | |
| 7,120,199 B2 | 10/2006 | Thielecke et al. | |
| 7,289,770 B2 | 10/2007 | Li et al. | |
| 7,317,702 B2 | 1/2008 | Dominique et al. | |
| 7,463,601 B2 | 12/2008 | Lee et al. | |
| 7,769,098 B2 | 8/2010 | Borkar et al. | |
| 8,126,406 B2 | 2/2012 | Hottinen | |
| 2004/0142698 A1 | 7/2004 | Pietraski | |
| 2005/0171770 A1* | 8/2005 | Yamaura | 704/219 |
| 2006/0093058 A1 | 5/2006 | Skraparlis | |
| 2006/0193294 A1 | 8/2006 | Jorswieck et al. | |
| 2007/0032196 A1 | 2/2007 | Dominique et al. | |
| 2007/0041322 A1 | 2/2007 | Choi et al. | |
| 2007/0191066 A1 | 8/2007 | Khojastepour et al. | |
| 2007/0195908 A1 | 8/2007 | Attar et al. | |
| 2007/0254602 A1 | 11/2007 | Li et al. | |

(Continued)

FOREIGN PATENT DOCUMENTS

| | | |
|---|---|---|
| CN | 1592144 A | 3/2005 |
| CN | 1909402 A | 2/2007 |

(Continued)

OTHER PUBLICATIONS

Park, S., et al., "UL Multiple Access in view of MIMO Support", IEEE 802.16 Broadband Wireless Access Working Group, Jan. 16, 2008, pp. 1-6.

(Continued)

*Primary Examiner* — Anez Ebrahim
(74) *Attorney, Agent, or Firm* — Slater & Matsil, L.L.P.

(57) ABSTRACT

Adaptive precoding codebooks are described. In one embodiment, the method of wireless communication includes reading at least a rank-2 baseline codebook having codewords representing precoding matrices. An adaptive codebook is generated by multiplying a first column of the codeword with a first transform matrix calculated from a channel correlation matrix, and multiplying a second column of the codeword with a second transform matrix calculated from the channel correlation matrix. The first and the second transform matrices are orthogonal.

20 Claims, 3 Drawing Sheets

(56) References Cited

U.S. PATENT DOCUMENTS

| | | |
|---|---|---|
| 2007/0259671 A1 | 11/2007 | Cheng et al. |
| 2007/0293230 A1 | 12/2007 | Lee |
| 2008/0013610 A1 | 1/2008 | Varadarajan et al. |
| 2008/0019345 A1* | 1/2008 | Wu et al. ............ 370/341 |
| 2008/0026744 A1 | 1/2008 | Frederiksen et al. |
| 2008/0299917 A1 | 12/2008 | Alexiou et al. |
| 2008/0304463 A1* | 12/2008 | Borkar et al. ............ 370/342 |
| 2008/0317145 A1 | 12/2008 | Clerckx et al. |
| 2009/0017769 A1 | 1/2009 | Chen et al. |
| 2010/0039928 A1* | 2/2010 | Noh et al. ............ 370/210 |
| 2010/0091893 A1 | 4/2010 | Gorokhov |
| 2012/0082116 A1 | 4/2012 | Kwon et al. |

FOREIGN PATENT DOCUMENTS

| | | |
|---|---|---|
| CN | 1921463 A | 2/2007 |
| CN | 101136718 A | 3/2008 |
| CN | 101212281 A | 7/2008 |
| CN | 101217034 A | 7/2008 |
| CN | 101217304 A | 7/2008 |
| CN | 101232356 A | 7/2008 |
| CN | 101253709 A | 8/2008 |
| EP | 1865619 A1 | 12/2007 |
| JP | 2005509316 A | 4/2005 |
| JP | 2008125069 A | 5/2008 |
| WO | 2007050860 A1 | 5/2007 |
| WO | WO 2007/050861 A2 | 5/2007 |
| WO | WO 2007/050861 (A2) | 5/2007 |
| WO | 2008147121 A1 | 4/2008 |
| WO | 2009022873 A2 | 2/2009 |
| WO | 2009023681 A2 | 2/2009 |

OTHER PUBLICATIONS

3GPP Long Term Evolution (LTE/System Architecture Evolution (SAE), "Long Term Evolution of the 3GPP Radio Technology", http://www.3gpp.org/Highlights/LTE/LET.htm, pp. 1-8.

Catreux, S., et al., "Adaptive Modulation and MIMO Coding for Braodband Wireless Data Networks", Topics in Broadband Access, IEEE Communications Magazine, Jun. 2002, pp. 108-115.

Gesbert, D., et al., "From Theory to Practice: An Overview of MIMO Space-Time Coded Wireless Systems", IEEE Journal on Selected Areas in Communications, vol. 21, No. 3, Apr. 2003, pp. 281-302.

Joung, J., et al., "Capacity Evaluation of Various Multiuser MIMO Schemes in Downlink Cellular Environments", 17th International Symposium on Personal, Indoor and Mobile Radio Communications, 2006 IEEE, Sep. 11-14, 2006, pp. 1-5.

Katonia, Z., et al., "Proposal for improving link adaptation techniques in IPv6 based radio access networks", IST FP6 IP BRAODWAN No. 001930, pp. 1-4.

Khaled, N., et al., "Interpolation-Based Multi-Mode Precoding for MIMO-OFDM Systems with Limited Feedback", IEEE Transactions on Wireless Communications, vol. 6, No. 3, Mar. 2007, pp. 1003-1013.

Roopsha, S., et al., "Codebook Adaptation for Quantized MIMO Beamforming Systems", Proceedings of the Asilomar Conference on Signals, Systems, and Compterspp. 376-380, Pacific Grove, CA, USA, Oct. 30-Nov. 2, 2005, 5 pages.

Vu, M., et al., "MIMO Wireless Linear Precoding", IEEE Signal Processing Magazine, Sep. 2007, pp. 86-105.

European Search Report received in European Application No. 10755427.1-1237, mailed Apr. 26, 2012, 5 pages.

International Search Report and Written Opinion of the International Searching Authority receveived in Patent Cooperation Treaty Application No. PCT/CN2010/071208, mailed Jun. 17, 2010, 10 pages.

"Adaptive Codebook Designs for MU-MIMO", 3GPP TSG RAN WG1 meeting #56bis R1-091282, Seoul, Republic of Korea, Mar. 23-27, 2009, 8 pages.

Zhou, S., et al., "Optimal Transmitter Eigen-Beamforming and Space-Time Block Coding Based on Channel Correlations," IEEE International Conference on Communications, 2002, pp. 553-557.

Zhou, S., et al., "Optimal Transmitter Eigen-Beamforming and Space-Time Block Coding Based on Channel Correlations," IEEE Transactions on Information Theory, Jul. 2003, vol. 49, No. 7, pp. 1673-1690.

Love, D. J., et al., "Grassmannian Beamforming for Multiple-Input Multiple-Output Wireless Systems," IEEE Transactions on Information Theory, Oct. 2003, vol. 49, No. 10, pp. 2735-2747.

Xia, P., et al. "Design and Analysis of Transmit-Beamforming Based on Limited-Rate Feedback," IEEE 60th Vehicular Technology Conference, Sep. 26-29, 2004, vol. 3, pp. 1653-1657.

Xia, P., et al., "Achieving the Welch Bound with Difference Sets," IEEE Transactions on Information Theory, May 2005, vol. 51, No. 5, pp. 1900-1907.

Love, D. J., et al., "Limited Feedback Diversity Techniques for Correlated Channels," IEEE Transactions on Vehicular Technology, Mar. 2006, vol. 55, No. 2, pp. 718-722.

Xia, P., et al., "Design and Analysis of Transmit-Beamforming Based on Limited-Rate Feedback," IEEE Transactions on Signal Processing, May 2006, vol. 54, No. 5, pp. 1853-1863.

CMCC, et al., "Support for MBSFN Operation," 3GPP TSG RAN WG1 #49 R1-072483, May 7-11, 2007, 5 pages, Kobe, Japan.

Samsung, et al., "Codebook Design for 4Tx SU MIMO," 3GPP TSG RAN WG1 Meeting #49 R1-072235, May 7-11, 2007, pp. 1-17, Kobe, Japan.

Samsung, "Codebook Design for 8 Tx Transmission in LTE-A," 3GPP TSG RAN WG1 Meeting #56 R1-090618, Feb. 9-13, 2009, 7 pages, Athens, Greece.

Huawei, "Adaptive Codebook Designs for MU-MIMO," 3GPP TSG RAN WG1 Meeting #56bis R1-091282, Mar. 23-27, 2009, 8 pages, Seoul, Korea.

Ericssen, et al., "On CSI Feedback for IMT-Advanced Fulfilling CoMP Schemes," 3GPP TSG RAN WG1 Meeting #57bis R1-092737, Jun. 29, 2009-Jul. 3, 2009, 3 pages, Los Angeles, CA, USA.

First Office Action with Partial English Translation received in Chinese Application No. 201080009377.3, mailed Mar. 22, 2013, 10 pages.

Chinese Search Report received in Chinese Application No. 201080009377.3, mailed Mar. 14, 2013, 2 pages.

Notice of Reasons for Rejection with English Translation received in Japanese Application No. JP 2011-553270, mailed Apr. 2, 2013, 8 pages.

International Search Report and Written Opinion received in International Application No. PCT/CN/071023 mailed Jun. 17, 2010, 13 pages.

Extended European Search Report received in European Application No. 10750379.9 mailed Apr. 5, 2012, 10 pages.

* cited by examiner

ADAPTIVE PRECODING CODEBOOKS FOR WIRELESS COMMUNICATIONS

CROSS REFERENCE TO RELATED APPLICATION

This application relates to the following co-pending and commonly assigned patent applications: Ser. No. 61/162,591, filed Mar. 23, 2009, entitled "System and Method for Adaptive Codebook Designs for Multiuser MIMO" and Ser. No. 61/166,133, entitled "System and Method for Precoding Codebook Adaptation Using Statistical Channel Information," filed Apr. 2, 2009; which applications are hereby incorporated herein by reference.

TECHNICAL FIELD

The present invention relates generally to wireless communications, and more particularly to adaptive precoding codebooks for wireless communications.

BACKGROUND

In a wireless communications system, the communications system's capacity may be significantly improved when a transmitter (also referred to as a base station) has full or partial knowledge of a channel over which it will be transmitting. Information related to the channel may be referred to as channel state information (CSI). CSI may be obtained by the transmitter over a reverse feedback link through the channel. A receiver (also referred to as a mobile user end or mobile station or user equipment) of the transmissions made by the transmitter may transmit CSI back to the transmitter over the reverse feedback link through the channel.

In MIMO (multiple input multiple output) wireless communications, channel state information can be estimated at the wireless receiver and fed back to the wireless transmitter, so that the transmitter can adapt its transmit scheme to the wireless channel. Such feedback is usually achieved through a codebook, which serves as a common dictionary of the current channel condition to the wireless transmitter and receiver.

However, in practice, changes in the wireless channel can be much more severe than what can be accommodated by a static codebook. Using a dynamic codebook overcomes this problem but introduces the problem of increased complexity.

SUMMARY OF THE INVENTION

These and other problems are generally solved or circumvented, and technical advantages are generally achieved, by illustrative embodiments of the present invention.

In accordance with an embodiment of the present invention, a method of wireless communication comprises reading a baseline codebook of at least a rank-2, the baseline codebook comprising codewords representing precoding matrices. The method further comprises generating an adaptive codebook by multiplying a first column of the codeword with a first transform matrix calculated from a channel correlation matrix, and multiplying a second column of the codeword with a second transform matrix calculated from the channel correlation matrix. The first transform matrix is orthogonal to the second transform matrix.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments of the invention enable significant performance improvements by the use of dynamic precoding codebooks that incorporate spatial channel correlation data to a baseline codebook. In various embodiments, the transformations from the baseline codebook are carefully selected to minimize complexity while preserving a unitary codebook.

Using FIG. 1, a wireless communications system will be described in accordance with an embodiment of the invention. Flow diagrams at the receiver unit 110 and transmitter unit 105 are described in accordance with embodiments of the invention in FIGS. 2 and 3.

Figure 1:
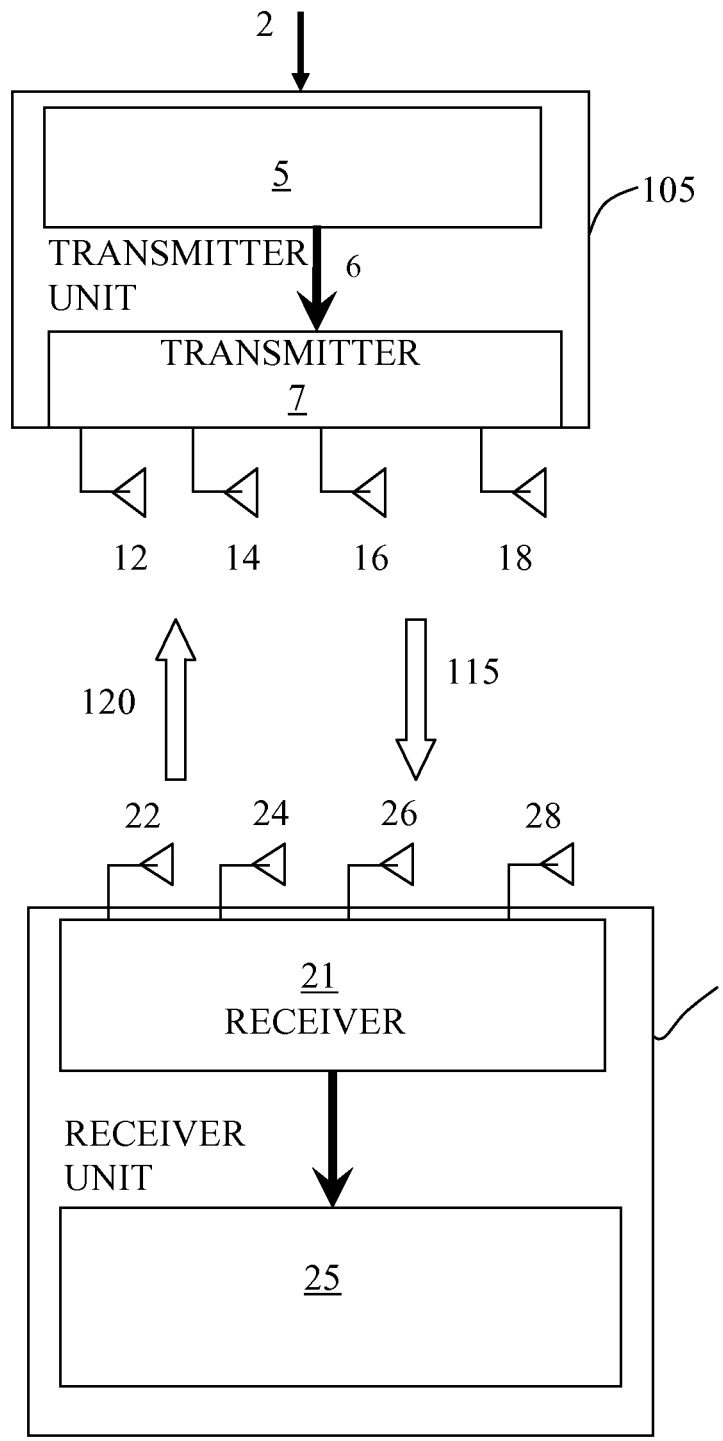
FIG. 1 is a portion of a wireless communication system, in accordance with an embodiment of the invention.

FIG. 1 is a portion of a wireless communication system, in accordance with an embodiment of the invention. A compressed digital source in the form of a binary data stream 2 is fed to a simplified transmitting block 5 within the transmitter unit 105, which is a base station or the like, or a router, e.g., on a home MIMO network. The transmitting block 5 encompasses the functions of error control coding and (possibly joined with) mapping to complex modulation symbols. The simplified transmitting block 5 produces several separate symbol streams which range from independent to partially redundant to fully redundant. Each of the symbol streams is mapped to one of the multiple transmitter antennas 12-18. After upward frequency conversion, filtering and amplification, the transmit signals 6 are transmitted to the transmitter 7 and launched into the wireless channel 115 by the multiple transmitter antennas 12-18 (four antennas are illustrated only as an example).

The wireless transmitter unit 105 communicates with the receiver unit 110 via the wireless channel 115. As an illustration, the wireless transmitter unit 105 comprises four transmit antennas 12, 14, 16, and 18 and the receiver unit 110 comprises four receive antennas 22, 24, 26, and 28. In other embodiments, any number of transmit antennas and any number of receive antennas are used to form a link through the channel 115. The transmitter unit 105 dynamically tailors the transmit signals 6 to be transmitted into the channel 115 in a manner, for example, that improves channel throughput or lowers bit error rate or both.

The signals transmitted from the transmit antennas 12, 14, 16, and 18 are received at the four receive antennas 22, 24, 26, and 28 of the receiver 21. Subsequently, demodulation and demapping operations are performed in demapper/demodulator 25 of the receiver unit 110 to recover the message. The level of intelligence, complexity, and a priori channel knowledge used in selecting the coding and antenna mapping algorithms are adapted during the link depending on the application and the nature of the transmission.

The receiver unit 110 transmits channel-related feedback information (or channel state information) to the transmitter unit 105 for use by the transmitting block 5 in developing transmit signals 6. The receiver unit 110 generates the feedback information by, for example, appropriately processing reference information received from the transmitter unit 105.

While providing detailed feedback of the channel will help to increase the spectral efficiency of the channel, practical limitations frequently prohibit its practical application. For example, detailed feedback can take up precious bandwidth and processing power. Further, the channel may vary over time and hence the feedback obtained at the transmitter is prone to imperfections such as feedback delay, feedback error, channel estimation error, and the like. Hence, a limited feedback is more preferred. On the other hand, non-adaptive designs using no channel state information suffer from poor performance.

As a consequence, transmit beamforming with limited feedback provides significant performance gains. To minimize information needed to provide feedback, a codebook is used. The beamforming codebook is designed and maintained at both transmitter unit 105 and the receiver unit 110 to facilitate the operation of limited feedback transmit beamforming. The codebook can be a collection of candidate precoding matrices/vectors to be used in generating the transmit signals 6. Codebooks are typically designed to match a particular type of channel characteristics, for example. For single user multiple input multiple output (SU-MIMO) independent and identically distributed (i.i.d.) Rayleigh fading channels, Grassmannian line/subspace packing (GLP) based codebook can achieve near optimal performance. On the other hand, these GLP codebooks do not perform well under spatially correlated fading channels.

Further, the above codebook designs are fixed in the sense that the codebook never changes during the link. As a consequence, while preferable for simplicity, the codebook does not perform well in drastically different fading scenarios (e.g., suburban macro fading, urban micro fading, urban macro fading), for different antenna spacing (e.g., 0.5λ, 4λ), different mobile speed, different antenna pattern and polarization profile.

Spatial correlation assisted codebook design is one way of improving system performance further. In this design, a fixed baseline codebook is first chosen from conventional designs (e.g., GLP, DFT, Householder or others). Then, the actual codebook is derived from the fixed baseline codebook depending on the channel. For example, the transformation used to derive the actual codebook may be based on medium to long term statistics of the channel (e.g., spatial channel correlation). The statistical channel information may be obtained at the transmitter either from infrequent feedback, or from uplink sounding signals assuming channel reciprocity at the channel statistics level. Thus, a varying codebook design is implemented that adapts the codebook to match the underlying channel characteristics.

Embodiments of the invention will now be described mathematically. First, a rank-1 adaptive codebook is described followed by embodiments of the invention describing a rank-2 adaptive codebook.

The received signal y at the receiver unit 110 is represented as:

$$y = H\Theta s + n, \qquad (1)$$

In any MIMO, there are $N_t$ antennas at the transmitter unit 105 and $N_r$ antennas at a receiver unit 110. Hence, there are $N_t \times N_r$ MIMO channels between the transmitter unit 105 and the receiver unit 110. In equation 1, H is the channel matrix of size $N_r \times N_t$, $\Theta$ is a unit norm beamformer of size $N_t \times 1$ selected from a pre-defined codebook $W^{1d}$, s is a scalar information symbol, and n is the additive white Gaussian noise.

The pre-defined codebook $W^{1d} = \{w_1, \ldots, w_N\}$ is a collection of N unit-norm candidate beamforming vectors each of size $N_t \times 1$, with number of feedback bits $B = \log_2 N$. Without loss of generality, let H be a zero mean and $R = E[H'H]$ be the transmitter side channel correlation matrix. The eigenvalue decomposition of the channel correlation matrix is given as:

$$R = \sum_{i=1}^{N_t} \sigma_i^2 v_i v_i'. \qquad (2)$$

Here $\sigma_1^2, \ldots, \sigma_{N_t}^2$ are the eigenvalues in a decreasing order and $V = [v_1, \ldots, v_{N_t}]$ is the unitary matrix collecting the eigenvectors in a corresponding order. A reduced rank representation of transmitter side channel correlation matrix R is defined as $$R_{l,k} = \sum_{i=l}^{k} \sigma_i^2 v_i v_i'; \qquad (3)$$

Equation 3 captures channel correlation matrix R from the $l^{th}$ eigenmode to the $k^{th}$ eigenmode. If the fixed baseline codebook is $W^{1d}$, then the adaptive codebook $W_{full}^{1d}$ is obtained by transformation as:

$$W_{full}^{1d} = N(R W_{base}^{1d}), \qquad (4)$$

In equation 4, the function N( ) performs column-wise vector normalization to maintain that each codeword in the adaptive codebook is a unit-norm vector. In other words, the new codebook is simply a transformed version of the baseline codebook $W^{1d}$, while the transformation is determined by the underlying statistical channel information (transmitter side channel correlation matrix R). As a consequence, the adapted codebook $W_{full}^{1d}$ has exactly the same dimension as the baseline codebook $W^{1d}$. The subscript "full" indicates the fact that a full representation of transmitter side channel correlation matrix R is used to transform the baseline codebook.

Another possible transformation is to use the reduced rank representation as:

$$W_{reduced}^{1d} = N(R_{1,k} W_{base}^{1d}), \qquad (5)$$

where only the first (strongest) k eigenmodes of the transmitter side channel correlation matrix R are used in the transformation. This reduces feedback overhead associated with using the full channel correlation matrix R. The subscript "reduced" indicates that only a reduced representation of the channel correlation matrix R is used to transform the baseline codebook.

Yet another possible transformation is to use $$W_{reduced}^{1d} = N(R_{1,k}^m W_{base}^{1d}), \quad (6)$$

where m is a power factor that may be different than 1. For most applications, m=½ (square root) and 1 perform similarly. In various embodiments described herein, a value of m=1 is used for consistency, although in other embodiments different m's are possible. The above designs are disclosed in U.S. Provisional Application No. 61/162,591 "System and Method for Adaptive Codebook Designs for Multiuser MIMO" filed on Mar. 23, 2009, which is incorporated herein by reference.

Embodiments of the invention describe transforming a higher rank codebook using statistical channel information. As an illustration, a dual and a three layer adaptive codebook are described although the technique can be generalized for higher rank codebooks in various embodiments.

The received signal of a rank-2 SU-MIMO is defined as $$y = H\Theta s + n, \quad (7)$$

wherein H is the channel matrix of size $N_r \times N_t$ quantized by a pre-defined codebook $F^{2d}$, $\Theta$ is a unitary precoder of size $N_t \times 2$, s is the $2 \times 1$ information symbol vector, and n is the $N_r \times 1$ additive white Gaussian noise. Here, $F^{2d}$ is a collection of N unit-norm candidate codewords, with each codeword being an $N_t \times 2$ unitary matrix. If the channel matrix H comprises a mean of zero, the channel correlation matrix R may be represented as R=E[H'H]. In particular, let the $k^{th}$ codeword of the rank-2 baseline codebooks is defined as:

$$\{F_{base}^{2d}\}_k = [f_{k1}, f_{k2}], \quad (8)$$

where $f_{k1}, f_{k2}$ are the two columns of the $k^{th}$ codeword which is a rank-2 unitary matrix.

Different transformation methods may be used in adapting such a rank-2 codeword by taking advantage of the channel statistics. First, the transformation used in the rank-1 case, as defined in (4), can be generalized directly as follows $$\{F_{same}^{2d}\} = \text{GRAM}([R_{1,N_t}f_{k1}, R_{1,N_t}f_{k2}]), \quad (9)$$

i.e., both columns of the codeword are transformed by the same channel correlation matrix $R_{1,N_t}$ and hence represented with the subscript "same." The function GRAM( ) performs the standard Gram-Schmidt orthonormalization process for a general non-unitary matrix such that the resultant codeword is guaranteed to be unitary.

Another design uses a different correlation matrix to transform each column of the codeword. For example, in $$\{F_{diff}^{2d}\}_k = \text{GRAM}([R_{1,N_t}f_{k1}, R_{2,N_t}f_{k2}]), \quad (10)$$

wherein the first column is transformed by the original channel correlation matrix $R_{1,N_t}$, while the second column is transformed by $R_{2,N_t}$, which is the channel correlation matrix excluding the strongest eigenmode. Hence, the transformed codebook is represented with the subscript "diff." Advantageously, equation 10 converges faster as the first column would converge to $v_1$ after transformation by $R_{1,N_t}$ and that the second column would converge to $v_2$ after transformation by $R_{2,N_t}$. This method is disclosed in Provisional Application No. 61/166,133, "System and Method for Precoding Codebook Adaptation Using Statistical Channel Information," filed on Apr. 2, 2009, which is incorporated herein by reference. Nevertheless, the Gram-Schmidt orthonormalization process carried out afterwards damages the convergence, since $R_{1,N_t}f_{k1}$ and $R_{2,N_t}f_{k2}$ in general are not orthogonal to each other.

Embodiments of the invention overcome these problems by providing a scheme for fast convergence without doing a Gram-Schmidt orthonormalization process over the whole matrix. In accordance with an embodiment of the invention, the $k^{th}$ codeword of the baseline codebook $F^{2d}$ is transformed as $$\{F_{oddeven}^{2d}\}_k = [N(R_{odd}f_{k1}), N(R_{even}f_{k2})]. \quad (11)$$

where $R_{odd}$ captures the joint contribution from the odd eigenmodes of the channel correlation matrix R and defined as:

$$R_{odd} = \sum_{i=1,3,5,\ldots} \sigma_i^2 v_i v_i' \quad (12)$$

and $R_{even}$ captures the joint contribution from the even eigenmodes of channel correlation matrix R and defined as:

$$R_{even} = \sum_{i=2,4,6,\ldots} \sigma_i^2 v_i v_i' \quad (13)$$

Hence, the derived codebook is represented with subscript of "oddeven." Importantly, $R_{odd} f_{k1}$ is orthogonal to $R_{even} f_{k2}$ by construction, for arbitrary initial vectors of $f_{k1}, f_{k2}$. Consequently, and advantageously, no Gram-Schmidt orthonormalization is required. The odd-even adaptive codebook $F_{oddeven}^{2d}$ is thus designed as:

$$[\{F_{oddeven}^{2d}\}_1, \{F_{oddeven}^{2d}\}_2, \{F_{oddeven}^{2d}\}_3, \{F_{oddeven}^{2d}\}_k, \ldots, \{F_{oddeven}^{2d}\}_N] \quad (14)$$

In various embodiments, a transformed codebook is obtained for higher rank codebooks by adapting a baseline codebook with spatial channel information. In one embodiment, the method uses a first transformation matrix to transform the first column of each codeword within the codebook, and uses a different second transformation matrix to transform the second column of each codeword within the codebook. The transformation matrices are carefully chosen such that they are orthogonal so that no Gram-Schmidt orthonormalization or similar procedure is needed to make the transformed codeword a valid unitary transmit precoding matrix.

In one embodiment, for designing a rank-2 adaptive codebook, odd eigenmodes (eigenmode 1, 3, 5 . . . ) of the channel correlation matrix R transform the first column of the codeword, while even eigenmodes (eigenmode 2, 4, 6 . . . ) of the channel correlation matrix R transform the second column of the codeword.

An alternative embodiment of the invention for a rank-3 codebook is now described. In one embodiment, a rank-3 adaptive codebook ($F^{3d}$) is designed using a first set of eigenmodes (eigenmodes 1, 4, 7, . . . ) of the channel correlation matrix R to transform the first column of the codeword. A second set of eigenmodes (eigenmodes 2, 5, 8, . . . ) of the channel correlation matrix R transforms the second column of the baseline codeword. Finally, a third set of eigenmodes (eigenmodes 3, 6, 9, . . . ) of the channel correlation matrix R transform the third column of the baseline codeword. The $k^{th}$ codeword of the rank-3 adaptive codebook ($F^{3d}$) is thus designed as:

$$\{F^{3d}\}_k = [N(R_{first}f_{k1}), N(R_{second}f_{k2}), N(R_{third}f_{k3})] \quad (15)$$

In various embodiments, the first transformation matrix A for the first column and the second transformation matrix B are selected to be orthogonal such that AB'=0. B' is the transpose of the second transformation matrix B. The first and the second transformation matrices A and B are functions of the channel correlation matrix R. The adaptive code book is then obtained using the transformation defined as:

$$\{F_{ortho}^{2d}\}_k = [Af_{k1}, Bf_{k2}] \quad (16)$$

Because of the orthogonal transformation ($Af_{k1}$ and $Bf_{k2}$), both the transformed columns $Af_{k1}$ and $Bf_{k2}$ remain orthogonal even after the transformation. As a consequence, a Gram-Schmidt orthogonalization of the whole codeword ($F_{ortho}^{2d}$) is avoided, which is otherwise required to form valid unitary matrices.

In various embodiments, the selection of odd eigenmodes (eigenmode 1, 3, 5 . . . ) of the channel correlation matrix R as the first transformation matrix A and the even eigenmodes (eigenmode 2, 4, 6 . . . ) as the second transformation matrix B is one way of ensuring that the first and the second transformation matrices A and B are orthogonal.

An embodiment of the invention for a rank-3 codebook is now described. In various embodiments, a rank-3 adaptive codebook $F_{ortho}^{3d}$ is designed by extending the prior embodiment for a rank-2 adaptive codebook. The first transformation matrix A for the first column and the second transformation matrix B are selected to be orthogonal. Similarly, a third transformation matrix C is chosen to be orthogonal to the first and the second transformation matrices. The first, the second, and the third transformation matrices A, B, and C are functions of the channel correlation matrix R. The adaptive code book is obtained using the transformation defined as:

$$\{F_{ortho}^{3d}\}_k = [Af_{k1}, Bf_{k2}, Cf_{k3}] \quad (17)$$

Knowledge of the spatial channel correlation matrix is needed at both the transmitter and receiver to perform the transformations at both the transmitter unit 105 and the receiver unit 110. Assuming that channel correlation is available to both transmitter unit 105 and receiver unit 110, not much additional information is needed to enable the adaptive codebooks. A signaling bit may be used to synchronize the transmitter unit 105 and receiver unit 110 to ensure that they use the common codebook, which may either be the baseline codebook or a transformed codebook based on common knowledge of the channel correlation matrix.

Using embodiments of the invention, the codebook adapts to spatial channel correlations achieving significant performance gains. Because of the adaptive nature of the codebook, system performance is less dependent on the particular choice of the baseline codebook.

Embodiments of the invention applied to the receiver unit 110 and the transmitter unit 105 are described below using FIGS. 2 and 3.

Figure 2:
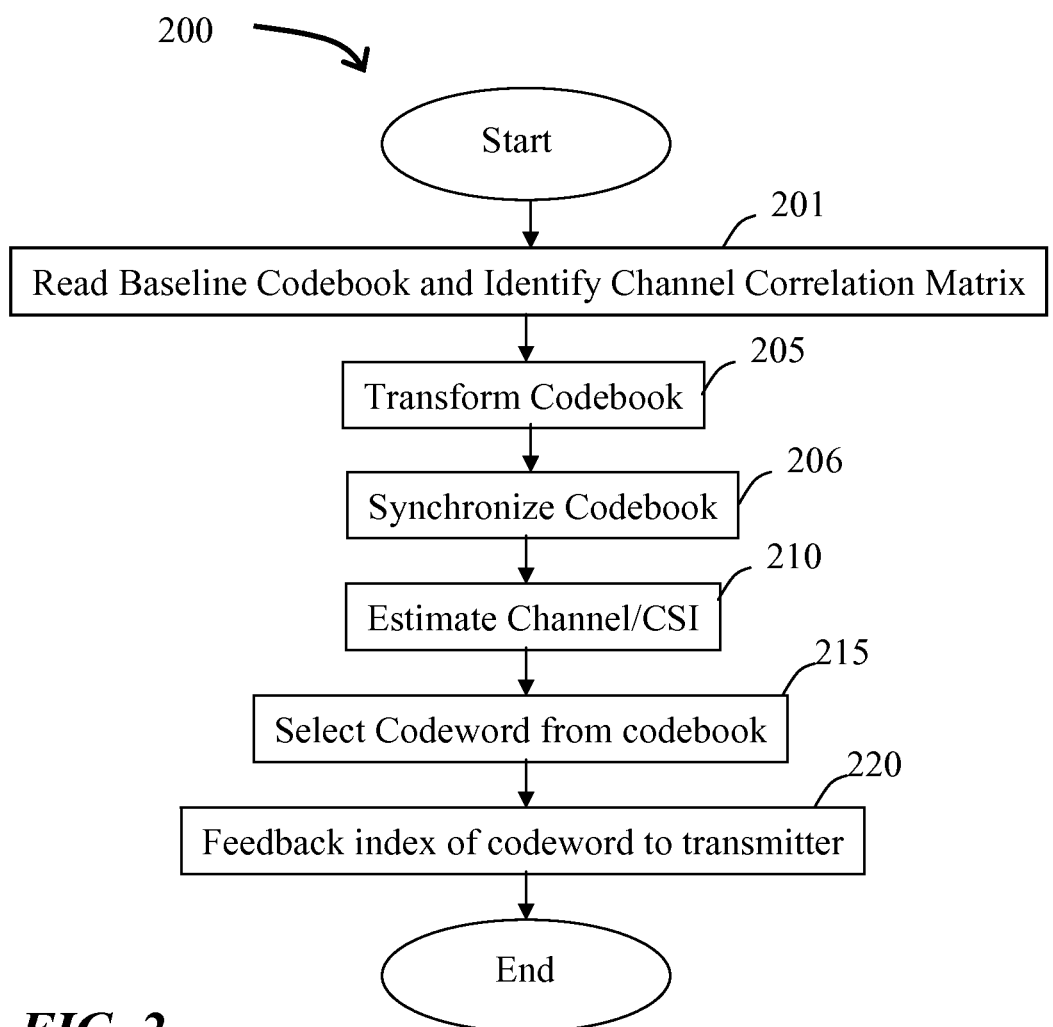
FIG. 2 illustrates a flow diagram of a receiver in operation in accordance with an embodiment of the invention.

FIG. 2 (along with FIG. 1) illustrates a flow diagram for receiver operation 200 in accordance with an embodiment of the invention. Receiver operation 200 may be descriptive of operations taking place in a receiver, such as receiver unit 110 which may be a mobile user unit. Receiver operation 200 may occur periodically as specified in a technical standard or description of a wireless communications system wherein transmitter unit 105 and receiver unit 110 operate. Alternatively, receiver operation 200 may occur each time receiver unit 110 receives a special transmission from the transmitter unit 105, or when a specified metric (such as an error rate, successful transmission rate, or so forth) meets or does not meet a specified threshold, and so forth, the receiver unit 110 may report CSI to the transmitter unit 105.

Receiver operation 200 may begin with reading the baseline codebook and the calculating the current channel correlation matrix (box 201). The current channel correlation matrix may be a time averaged information. Then, the receiver unit 110 transforms the baseline codebook using the channel correlation matrix (box 205). The baseline codebook may be any suitable codebook including Grassmannian line/subspace packing (GLP) based codebooks, DFT based codebooks, complex Hadamard transform (CHT) or Hadamard-based, Householder, Lloyd-Max algorithm, and the like.

The transforming of the baseline codebook may follow techniques described above, such as using equations (11), (14), (15), (16), or (17). In one embodiment, the receiver unit 110 transforms the baseline codebook after receiving a signal from the transmitter unit 105 instructing receiver unit 110 to transform the baseline codebook, for example. Alternatively, the receiver unit 110 transforms the baseline codebook periodically at specified time intervals (e.g., agreed upon time intervals), or when an event occurs (such as an error rate, a success rate, or some other metric meets a specified threshold), and so forth.

After transforming the baseline codebook (which also occurs at transmitter unit 105), the receiver unit 110 and the transmitter unit 105 synchronize to ensure both are using the same codebook at a given time (box 206). Then, receiver unit 110 estimates a channel, such as channel 115, over which transmitter unit 105 is transmitting information to receiver unit 110 (box 210). Receiver unit 110 may estimate channel 115 and quantize this information as CSI. The receiver unit 110 reports channel state information (CSI) back to the transmitter unit 105 by using a codeword. Based on the estimated channel/CSI, receiver unit 110 selects the codeword from the transformed codebook (box 215). For example, the receiver unit 110 selects a particular codeword to maximize the aggregate number of data bits at all of its receiving antennas. In various embodiments, the receiver unit 110 quantizes the channel using similar techniques for both SU-MIMO and MU-MIMO. The receiver unit 110 selects the index corresponding to the selected codeword.

Receiver unit 110 may then feedback the chosen index to the transmitter unit 105 over a feedback link 120 through the channel 115 (box 220). Receiver operations 200 may then terminate.

Figure 3:
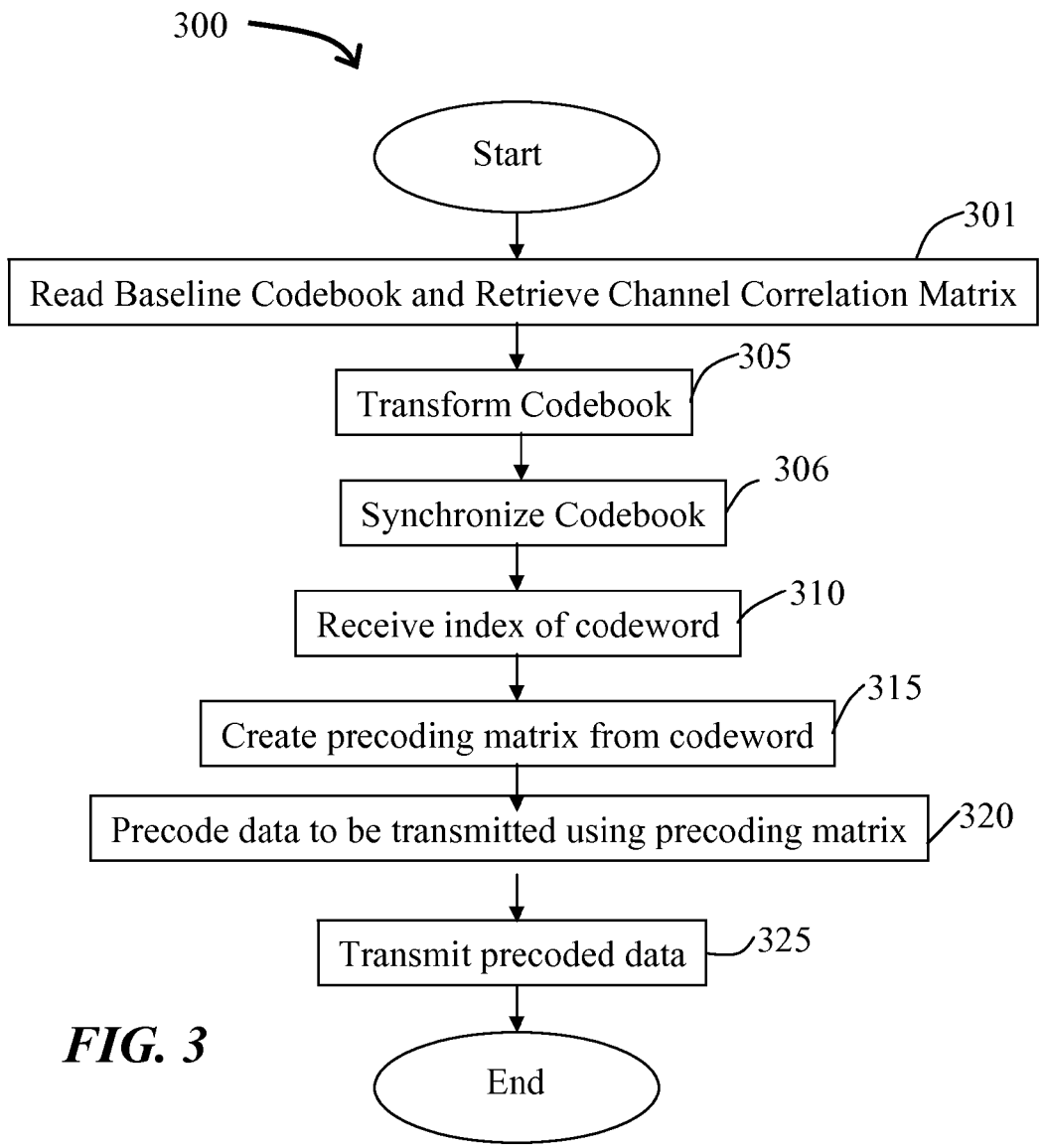
FIG. 3 illustrates a flow diagram of a transmitter in operation in accordance with an embodiment of the invention.

FIG. 3 illustrates a flow diagram for transmitter operation 300 in accordance with an embodiment of the invention. Transmitter operation 300 may be descriptive of operations taking place in a transmitter, such as transmitter unit 105, when transmitter unit 105 receives CSI from a receiver, such as receiver unit 110. Similar to the receiver operation 200, in various embodiments, the transmitter operation 300 may occur periodically as specified in a technical standard or description of a wireless communications system wherein transmitter unit 105 and receiver unit 110 operate. Alternatively, transmitter operation 300 may occur after transmitter unit 105 receives CSI from receiver unit 110, and so forth.

Transmitter operation 300 may begin with the transmitter unit 105 reading the baseline codebook. The transmitter 110 also receives channel correlation matrix from the receiver unit 110 (box 301). The transmitter unit 105 transforms the baseline codebook (box 305) using the techniques described above with respect to equations (11), (14), (15), (16), or (17). Transmitter unit 105 may transform the baseline codebook periodically at specified time intervals, or when an event occurs (such as an error rate, a success rate, or some other metric meets a specified threshold), and so forth. The receiver unit 110 may perform the transformation of the baseline codebook at about the same time as transmitter unit 105 to ensure that both transmitter unit 105 and receiver unit 110 are using the same codebook. Further, the receiver unit 110 and the transmitter unit 105 synchronize to ensure both are using the same codebook at a given transmission (box 306).

Transmitter unit 105 may receive an index to a codeword in the transformed codebook from the receiver unit 110 (box 310). The codeword may be a quantized version of an estimated CSI and may be selected from the transformed codebook by the receiver unit 110. In general, transmitter unit 105 may receive feedback from various receivers and may use the codewords retrieved from the transformed codebook to generate a precoding matrix (box 315) and choose beamformers accordingly. In one case, for selecting beamformers, the transmitter unit 105 uses the same codeword index as received from the receiving unit 110. Alternatively, in another embodiment, the transmitted unit 105 may derive beamformers based on the codeword index. However, the transmitter unit 105 may also select the beamformers differently for SU-MIMO and MU-MIMO. For example, the transmitter unit 105 may also use information from other receivers in choosing the precoding matrix.

Based on the precoding matrix, information symbols (data to be sent) is precoded (box 320). For example, the mapping of the information symbols to each antenna is accomplished using the precoding matrix. The data thus precoded is transmitted into the channel to be received by the receiver unit 110 (box 325). Transmitter operation 300 may then be stopped.

In various embodiments, the transformation of the baseline codebook adapts the codebook to the spatial channel correlation (or other long term information) for higher rank transmissions. For each codeword, its columns are transformed differently where the transformations may be obtained from the spatial channel correlation matrix or a function thereof. In general, the transformation may be represented by matrix multiplications.

In various embodiments, a new codebook is generated, having the same size as the original baseline codebook. As the spatial channel correlation changes slowly, the transmitter updates its knowledge of transmitter side channel correlation matrix R based on an infrequent feedback or uplink sounding, and accordingly updates the codebook as well. Thus, a common codebook is agreed upon between the transmitter and receiver at this point.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of wireless communication comprising:
   at a processor, reading a baseline codebook of at least a rank-2, the baseline codebook comprising codewords representing precoding matrices; and
   generating an adaptive codebook by:
   multiplying a first column of a codeword of the baseline codebook with a first transform matrix calculated from a channel correlation matrix, and
   multiplying a second column of the codeword with a second transform matrix calculated from the channel correlation matrix, wherein the first transform matrix and the second transform matrix are distinct orthogonal matrices, and wherein the first transform matrix and the second transform matrix are not part a common matrix;
   after generating the adaptive codebook, selecting a codeword index of the adaptive codebook to quantize channel state information; and
   sending the selected codeword index to a transmitter.

2. The method of claim 1, wherein the baseline codebook is a rank-2 codebook, and wherein the first transform matrix comprises a summation using the odd eigenmodes of the channel correlation matrix, and wherein the second transform matrix comprises a summation using the even eigenmodes of the channel correlation matrix.

3. The method of claim 1, further comprising at the transmitter, selecting beamformers for transmitting data to the receiver in accordance with the selected codeword index.

4. The method of claim 3, wherein the selected beamformers are exactly the same as the selected codeword index.

5. The method of claim 3, wherein the selected beamformers are different from the selected codeword index.

6. The method of claim 1, wherein the adaptive codebook is generated at both a receiver and a transmitter, and wherein the transmitter and the receiver exchange information to synchronize the use of the adaptive codebook.

7. The method of claim 6, further comprising:
   calculating a channel correlation matrix before generating an adaptive codebook;
   after exchanging information to synchronize, receiving a codeword index from a receiver;
   retrieving a codeword from the adaptive codebook;
   generating a precoding matrix from the codeword; and
   precoding data to be transmitted using the precoding matrix.

8. The method of claim 1, wherein the adaptive codebook is generated periodically at specified time intervals.

9. The method of claim 1, wherein the adaptive codebook is generated when a predefined criterion is met.

10. The method of claim 9, wherein the criterion comprises a metric requiring a predefined threshold.

11. The method of claim 1, wherein generating an adaptive codebook further comprises multiplying a third column of the codeword with a third transform matrix calculated from the channel correlation matrix, wherein the third transform matrix is orthogonal with the first transform matrix and the second transform matrix.

12. The method of claim 11, wherein the baseline codebook is a rank-3 codebook, and wherein the first transform matrix comprises a summation using $3k-2$ eigenmodes of the channel correlation matrix, wherein the second transform matrix comprises a summation using $3k-1$ eigenmodes of the channel correlation matrix, wherein the third transform matrix comprises a summation using $3k$ eigenmodes of the channel correlation matrix, and wherein k is a natural number less than the total number of transmitting antennas in a transmitter.

13. A method of wireless communication comprising:
at a mobile user device, generating an adaptive codebook by transforming a predefined baseline codebook of at least a rank-2, the baseline codebook comprising codewords representing precoding matrices, wherein the transforming comprises:
multiplying a first column of a codeword of the baseline codebook with a first transform matrix calculated from a channel correlation matrix, and
multiplying a second column of the codeword with a second transform matrix calculated from the channel correlation matrix, wherein the first transform matrix and the second transform matrix are distinct orthogonal matrices, and wherein the first transform matrix and the second transform matrix are not part a common matrix; and
after generating the adaptive codebook, selecting a codeword index of the adaptive codebook to quantize channel state information; and
sending the selected codeword to a transmitter.

14. The method of claim 13, wherein generating an adaptive codebook further comprises multiplying a third column of the codeword with a third transform matrix calculated from the channel correlation matrix, wherein the third transform matrix is orthogonal with the first transform matrix and the second transform matrix.

15. The method of claim 14, wherein the baseline codebook is a rank-3 codebook, and wherein the first transform matrix comprises a summation using 3k−2 eigenmodes of the channel correlation matrix, wherein the second transform matrix comprises a summation using 3k−1 eigenmodes of the channel correlation matrix, and wherein the third transform matrix comprises a summation using 3k eigenmodes of the channel correlation matrix, wherein k is a natural number less than total number of transmitting antennas in a transmitter.

16. A method of wireless communication comprising:
at a base station, generating an adaptive codebook by transforming a predefined baseline codebook of at least a rank-2, the predefined baseline codebook comprising codewords representing precoding matrices, wherein the transforming comprises:
multiplying a first column of a codeword of the predefined baseline codebook with a first transform matrix calculated from a channel correlation matrix, and
multiplying a second column of the codeword with a second transform matrix calculated from the channel correlation matrix, wherein the first transform matrix and the second transform matrix are distinct orthogonal matrices, and wherein the first transform matrix and the second transform matrix are not part of a common matrix;
after generating the adaptive codebook, at a receiver, selecting a codeword index of the adaptive codebook to quantize channel state information; and
sending the selected codeword index to a transmitter.

17. The method of claim 16, further comprising:
at the base station, receiving a codeword index from a mobile user device;
retrieving a codeword by looking up the index in the adaptive codebook;
generating a precoding matrix from the codeword; and
precoding data to be transmitted using the precoding matrix.

18. The method of claim 16, wherein generating an adaptive codebook further comprises multiplying a third column of the codeword with a third transform matrix calculated from the channel correlation matrix, wherein the third transform matrix is orthogonal with the first transform matrix and the second transform matrix.

19. The method of claim 18, wherein the baseline codebook is a rank-3 codebook, and wherein the first transform matrix comprises a summation using 3k−2 eigenmodes of the channel correlation matrix, wherein the second transform matrix comprises a summation using 3k−1 eigenmodes of the channel correlation matrix, and wherein the third transform matrix comprises a summation using 3k eigenmodes of the channel correlation matrix, wherein k is a natural number less than the total number of transmitting antennas in the transmitter.

20. The method of claim 16, wherein the adaptive codebook is generated periodically at specified time intervals.

\* \* \* \* \*